Figure 1:
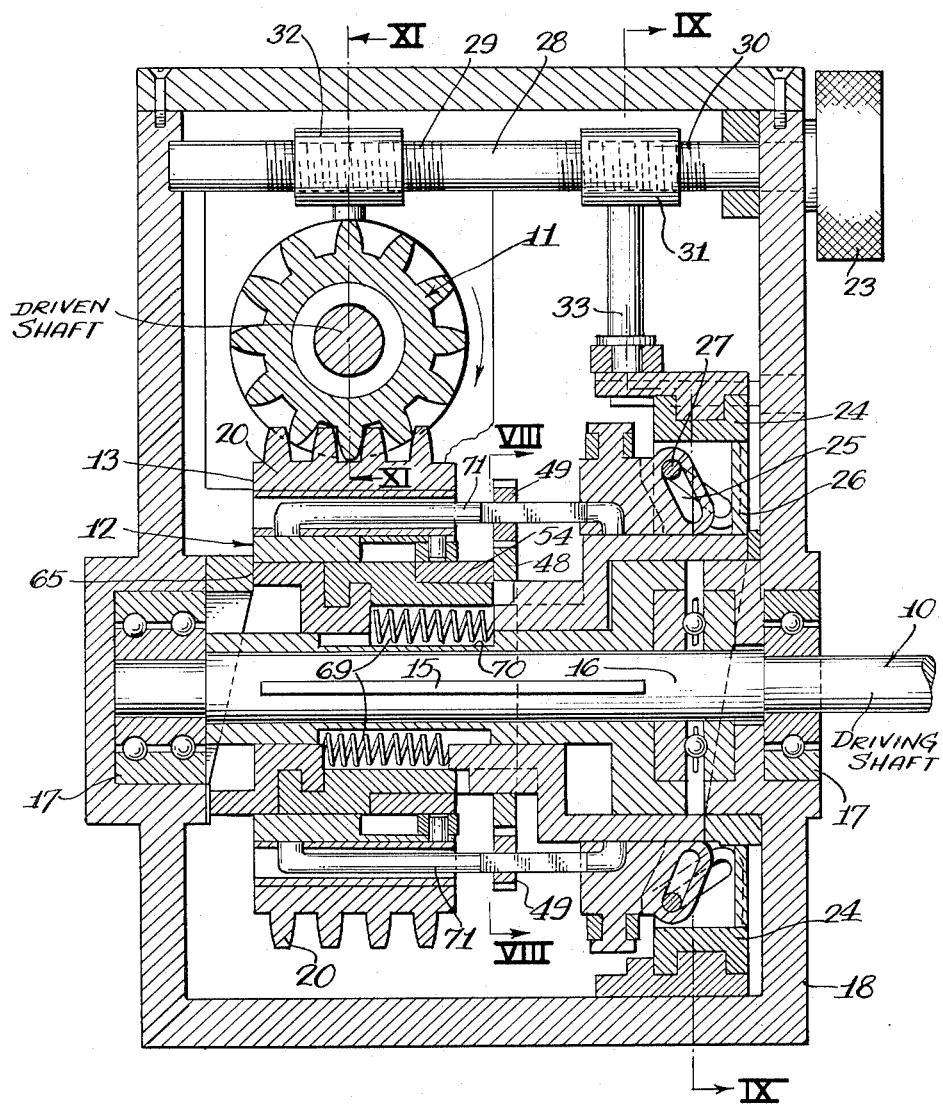

July 3, 1956 A. E. FOLTZ 2,752,799
VARIABLE TORQUE TRANSMISSION DEVICE
Filed July 21, 1954 7 Sheets-Sheet 1

INVENTOR.
Albert E. Foltz
BY
Edmund B Whitcomb
ATTORNEY

July 3, 1956  A. E. FOLTZ  2,752,799
VARIABLE TORQUE TRANSMISSION DEVICE
Filed July 21, 1954  7 Sheets-Sheet 2
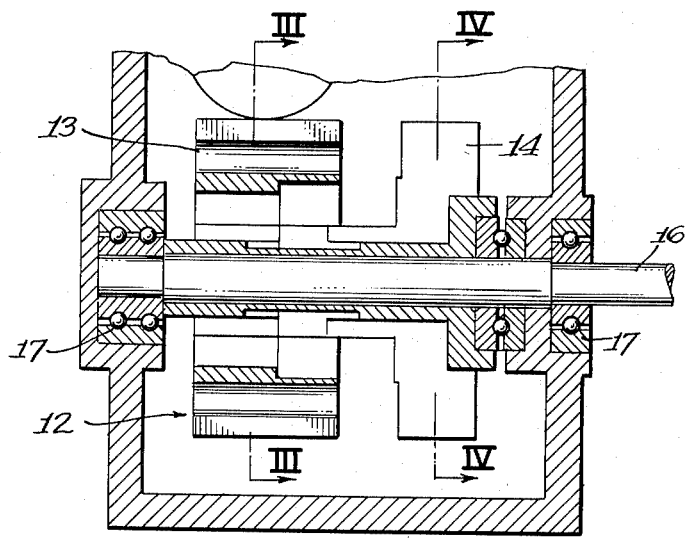
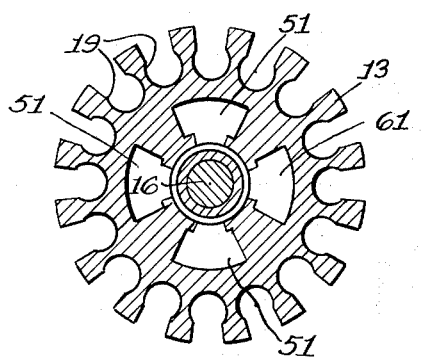
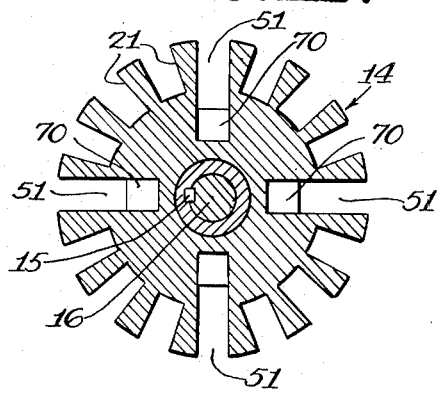
INVENTOR.
Albert E. Foltz
BY
Edmund B Whitcomb
ATTORNEY July 3, 1956  A. E. FOLTZ  2,752,799
VARIABLE TORQUE TRANSMISSION DEVICE
Filed July 21, 1954  7 Sheets-Sheet 3
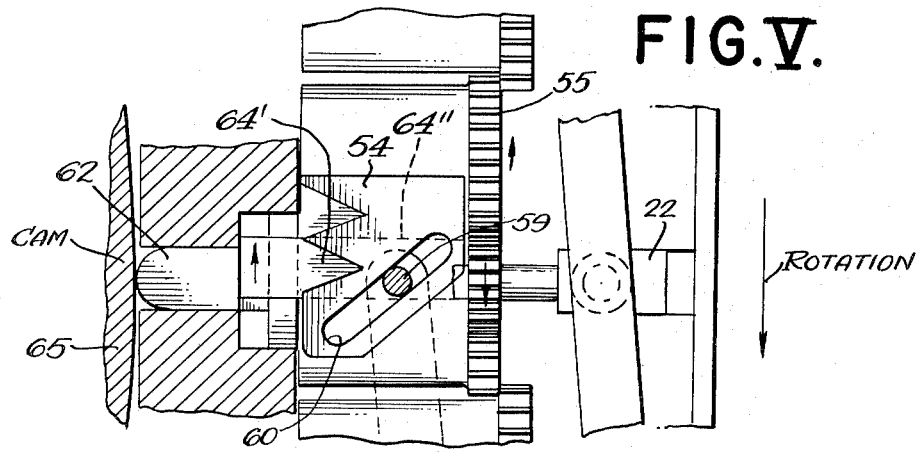
FIG. V.
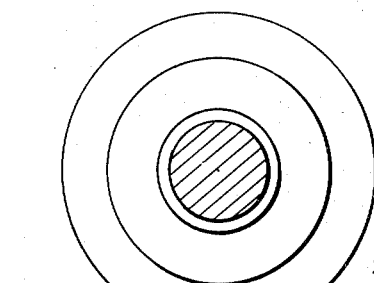
FIG. VI.
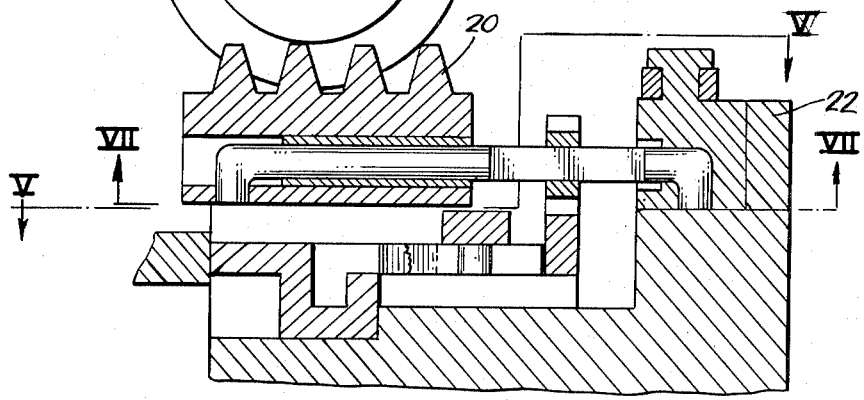
FIG. VII.
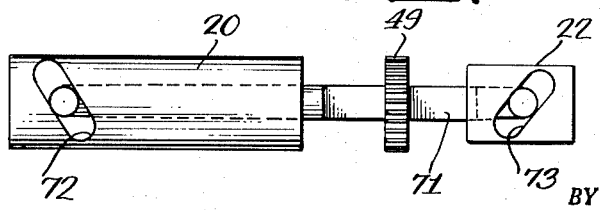
INVENTOR.
Albert E. Foltz
BY Edmund B. Whitcomb
ATTORNEY

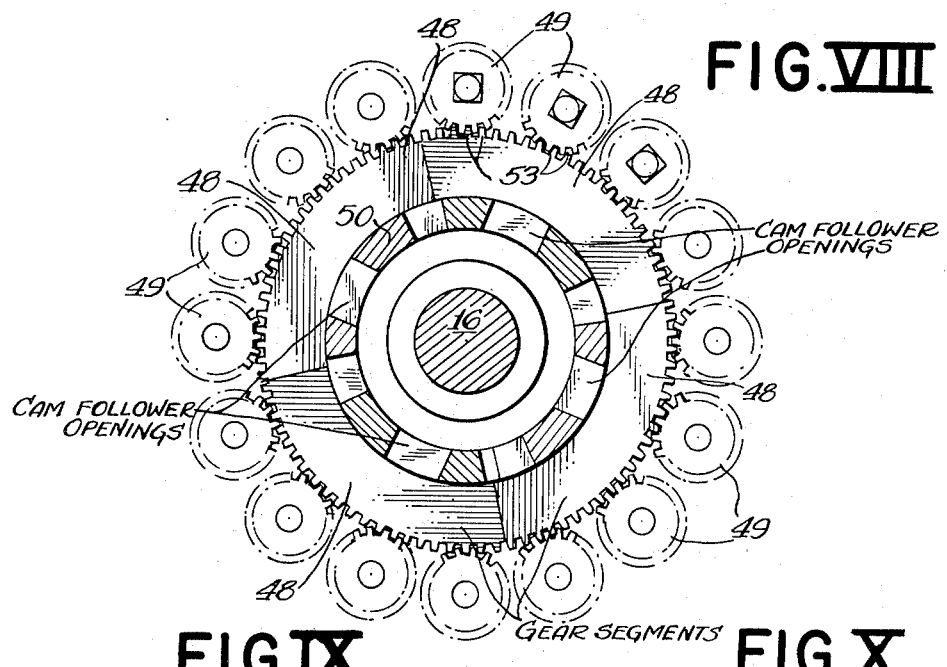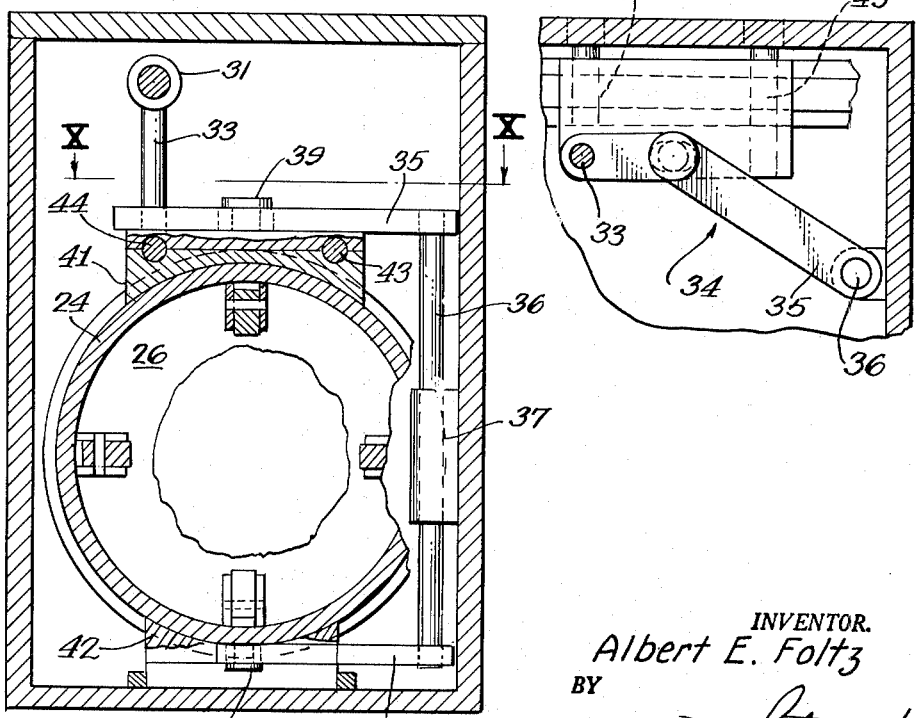

July 3, 1956
A. E. FOLTZ
2,752,799
VARIABLE TORQUE TRANSMISSION DEVICE
Filed July 21, 1954
7 Sheets-Sheet 5
FIG XI.
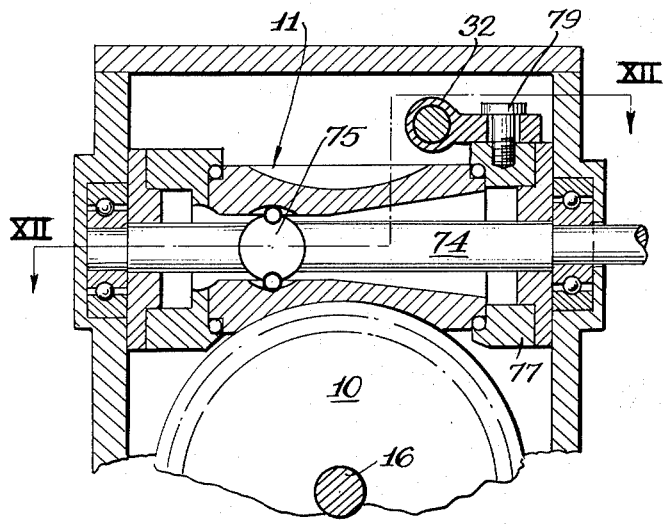
FIG. XII.
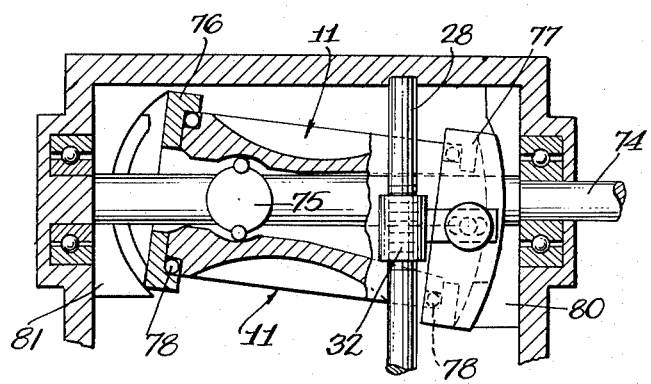
INVENTOR.
Albert E. Foltz
BY
Edmund P. Whiteout
ATTORNEY

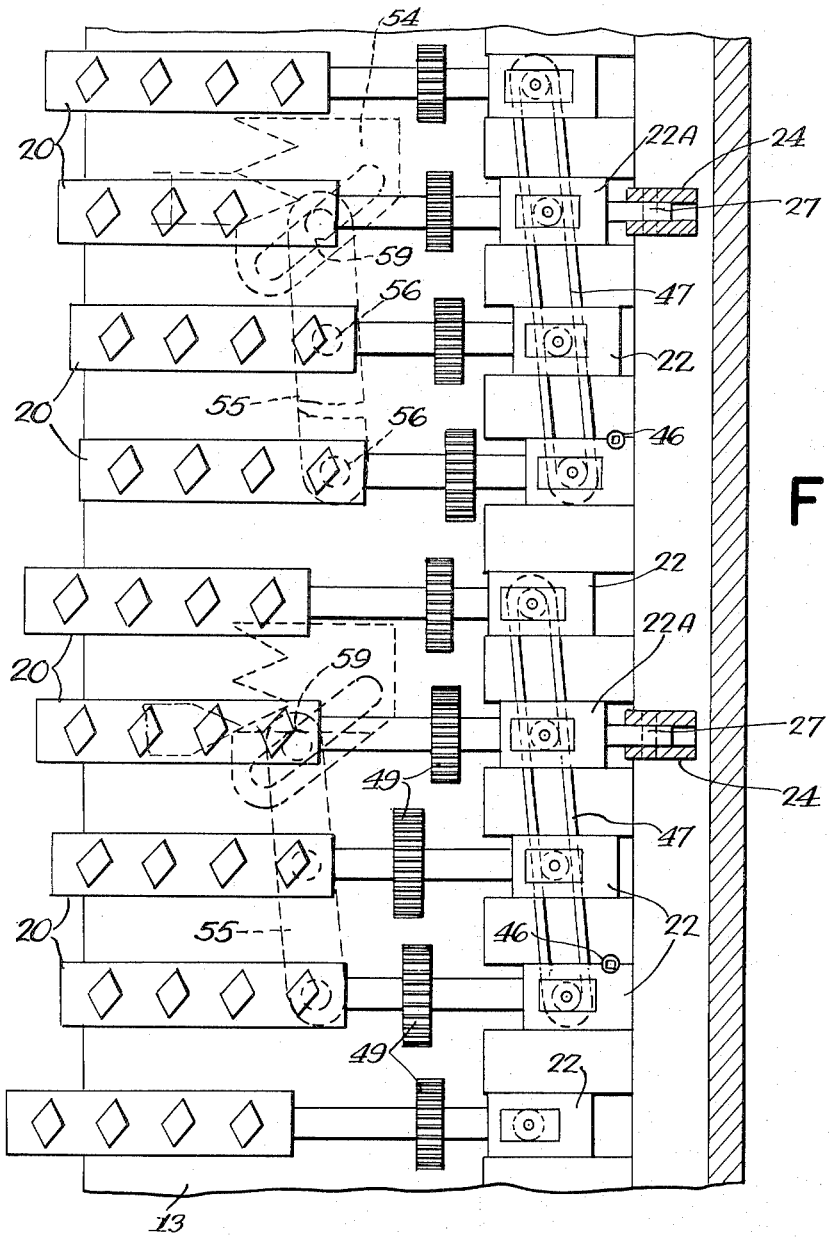
FIG. XIII.

FIG. XIV.
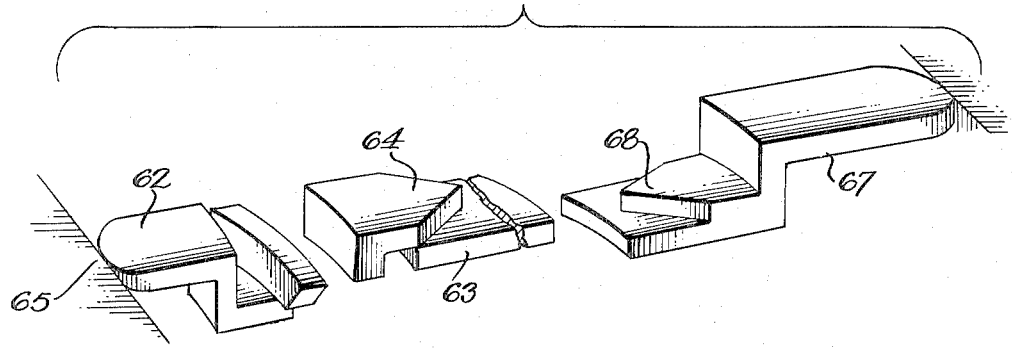
FIG. XV.
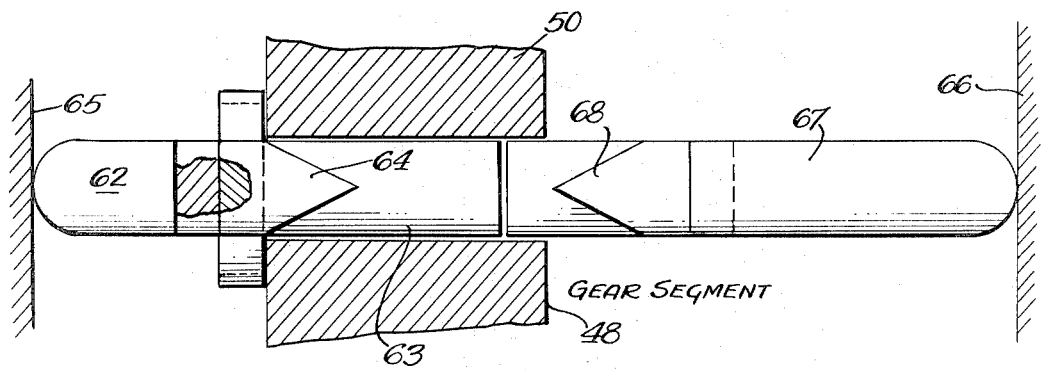

United States Patent Office 2,752,799
Patented July 3, 1956

2,752,799

VARIABLE TORQUE TRANSMISSION DEVICE

Albert E. Foltz, New York, N. Y.

Application July 21, 1954, Serial No. 444,689

7 Claims. (Cl. 74—325)

This invention relates to a variable mechanism for transmitting rotating mechanical power and consists primarily of two important parts of elements, a driving gear and a driven or follower gear in which I provide means to vary the pitch or lead of the driving gear teeth with respect to those on the follower or driven gear. An object of the invention is to provide such means to vary the lead so that in one extreme position the variable clutch may actually slip or provide no driving effect from one gear to the other and in its other extreme, the lead can be adjusted to a maximum by a simple manual controlling means, or the clutch may be set in any position intermediate of these two extremes, dependent upon the driving relation desired.

Further objects of this invention include means whereby this change can be accomplished whether the mechanism is in operation or at rest and also includes the provision in the construction of means whereby the driving gear operates at constant speed and varying load while the follower or driven gear operates at varying speed and constant load. These conditions may, of course, be greatly varied in use as desired and the mechanism set in any one of an infinite number of positions.

Further objects of the invention include providing a mechanism of the type disclosed in which an automatically operating aligning means is arranged to insure proper nesting of the gear teeth of the driver and follower gears under all of the variable driving conditions indicated above.

Further objects and advantages are within the scope of this invention, such as relate to the arrangement, operation and function of the related elements of the structure, to various details of construction and to combination of parts, to certain sub-combinations or elements per se, and numerous other features, as will be apparent from a consideration of the specification and drawing of a form of the invention, which may be preferred, in which:

Figure I is a sectional elevation of one embodiment of my device;

Figure II is a partial sectional elevation of the main drive shaft and associated parts;

Figure III is a section taken on the line III—III of Figure II;

Figure IV is a section taken on the line IV—IV of Figure II;

Figure V is an enlarged section taken on the line V—V of Figure VI;

Figure VI is an enlarged sectional view of the driving gearing illustrated in Figure I;

Figure VII is an enlarged section taken on the line VII—VII of Figure VI;

Figure VIII is a sectional view taken on the line VIII—VIII of Figure I;

Figure IX is a sectional view taken on the line IX—IX of Figure I;

Figure X is a sectional view taken on the line X—X of Figure IX;

Figure XI is a sectional view through the driven gear taken on the line XI—XI of Figure I;

Figure XII is a section taken on the line XII—XII of Figure XI;

Figure XIII is a diagrammatic development of the gearing mechanism for varying the power transmission;

Figure XIV is a perspective view of the cam follower elements; and

Figure XV is a diagrammatic plan of the cam elements.

Figure I shows the assembled mechanism wherein it is seen that my variable torque transmission device consists of two principal parts, a driver or driving gear mechanism indicated generally at 10 which has means for varying the lead and is driven at a constant speed and a follower or driven gear 11 with a fixed lead but which has a varying speed and is pivoted to its shaft as shown (Figures XI and XII).

As further illustrated in Figure I, the driving gearing 10 is mounted in a suitable housing and consists of a driving cage or revolving "armature" section 12, in two parts, the left-hand part carrying the driving gearing, said part indicated at 13 and the right-hand part—an adjusting mechanism, indicated generally at 14. Both these main parts or sections 13 and 14 are spaced apart as more clearly shown in Figure II, but contact each other at the hub, and both are keyed as indicated at 15 to the main driving shaft 16 and revolve therewith, said shaft being suitably carried by bearings 17 in the housing 18.

Generally speaking, my variable clutch includes in the left-hand armature section 13, a plurality of spaces or undercut recesses 19 for carrying the several separate adjustable gear sections 20 which are mounted circumferentially around the shaft 16 and so suitably carried in the cage elements 13 as to be slid longitudinally with respect to the shaft 16. In this manner the lead or pitch of the teeth of the gears 20 may be varied as they meet and drive the driven gear 11.

The main portion of the means for actually moving said gears 20 longitudinally of shaft 16 is mounted on the adjusting rotary supporting section 14, and this carrying cage or rotating support 14 has the same number of recesses 21 therein as the receiving pockets 19 in the gear supporting cage 13.

In the particular embodiment of my invention herein shown, I illustrate sixteen racks or sets of gear sections 20 arranged in groups of four each. These are positioned in the cages 13 surrounding shaft 16 and, in the adjustment shown for varying the lead or pitch of the teeth, I move the sections 20 in groups, as will hereinafter more fully appear. As shown in Figures I, IV, VI and VII, I provide a series of shifting blocks 22 with manual means to affect longitudinal movement thereof relative to shaft 16 and I provide interconnecting means between said blocks 22 and the gear sections 20 to shift the latter accordingly.

By turning a knurled knob 23 outside the housing (see Figure I), I provide linkage connections for operating a cam ring 24 to shift said ring 24 longitudinally and, in turn, the latter moves the shifting blocks 22. This cam ring 24 has elongated slots 25 (see Figure I).

I also use a backing plate 26 bolted to that end of the cage 14. Every fourth gear moving block 22 has an extension carrying a slot 25 therein as shown in Figure I. A free floating pin 27 (Figure I) is passed through these elongated holes 25 of the ring 24 and the fourth block 22. I have made the ring 24 into four parts to facilitate assembly. The inner rim of the ring 24 rests on the outer circumference of the backing plate 26 at all times. Figure XIII is a diagrammatic showing, as will be hereinafter described and illustrates how the ring by moving axially effects an increase or decrease in the driver lead.

In Figures I, IX and X, I show the linkage that controls the cam ring 24. Near the top of the housing, as stated above, is a rod 28 that has two sets of threads 29 and 30. One of these groups of threads 29 forms an adjustable means to swing the follower gear 11 around its pivot as shown in Figures XI and XII, while the other set of threads 30 is to adjust the gear sections 20 longitudinally to vary the pitch as will hereinafter appear. They have the same hand but different leads. The rod 28 is extended outside the casing and has the knurled knob 23 mounted on it. It is through this manually adjustable knob 23 that the variation of the speed of the follower 11 from the driver gearing 10 is accomplished. Mounted on the threaded rod 28 are two threaded sleeves 31 and 32. One sleeve 31 has a downwardly extended member 33 which engages the linkage 34 as shown in Figures I, IX and X. The other sleeve 32 engages a pin at the top of the follower slipper as shown in Figures XI and XII. A suitable linkage arrangement generally designated at 34 is provided to adjust the cam ring 24. This linkage has a lever member 35 adapted to receive the end of depending rod 33 by a suitable slideable connection, and is mounted for swinging movement on a rod 36, the same being carried in a bearing 37 attached to the housing wall as shown in Figure IX. The rod 36 has mounted on its lower end a lever 38, both levers 35 and 38 being rigidly attached to the rod 36 for simultaneous movement. Levers 35 and 38 are both provided with arcuate slots, the same to receive pins 39 and 40 for pivotal attachment with top and bottom slippers 41 and 42 mounted in sliding engagement with the ring 24.

A pair of fixed rods 43 and 44 are attached to the housing wall and form guide means for the top slipper 41, while a pair of fixed bars 45 attached to the lower wall of the housing provide guide means for the lower slipper 42. It will thus be seen that movement of lever 35 by rod 33, which, in turn, is controlled by the knurled knob 23 will cause adjustable lateral movement of ring 24 through the engagement of the slippers with the ring.

The adjustment of the cam ring 24 manually from the knurled button 23, the ring 24 being connected as stated above through pin 27 to the blocks 22 of every fourth gear section 20, is to properly adjust the pitch of the teeth as these driving sections drive the follower gear 11. To interconnect every fourth section 20 with the rest of the sections, I provide an interconnecting mechanism illustrated diagrammatically in Figure XIII. In this developed diagrammatic view, I show the pin 27 operated by the cam ring 24 as engaging the block 22A for one set of four interconnected gear sections 20, two sets only being shown in Figure XIII. One of the blocks 22 is fixed by a pin 46 to the cage so that as the pin 27 moves the block 22A, the other sections 20 of this group will be swung accordingly by means of an interconnected lever 47.

In order to properly adjust each tooth of each section as it comes into mesh with the follower gear 11, I provide a special adjusting mechanism, one embodiment of which is illustrated herein as follows:

In the space between the cages 13 and 14 of the revolving armature 12 are located four gear segments 48 surrounding shaft 16. The several separate segments 48 are offset one from another longitudinally relative to shaft 16, and the spur gears 49, which mesh with said segments 48 are also staggered accordingly, all as shown in the drawings, particularly Figure XIII. Specifically, each segment 48 is formed with a longitudinal arc-shaped portion 50 surrounding shaft 16 and positioned in openings 51 in the cage 13 to be rotated thereby. The radial portion 52 of the segment 48 has gear teeth 53 therein as shown in Figure VIII. Upon the hub sections of the gear segments 48 are located small plates 54 with a W cut in one edge (see Figure V).

There are four of these W-plates 54 equally spaced circumferentially around the armature 12 and pinned to each small W-shaped plate 54 is a strip of metal 55 of such length as to pass under three racks 22 (see Figure XIII). There are two holes 56 in this strip 55, into which fit pins 58 from the underside of certain of the main gear sections 22. At the other end of strip 55 is a pin 59 integral therewith, fittting into an elongated slot 60 of the W-shaped plates 54 to form the adjusting means for said W-plates 54.

The cage 13 has four central keystone-shaped openings 61 into which are fitted two part cam followers, one part 62 to engage a cam surface and the other part 63 having a V-shaped portion 64 thereon. These V-portions 64 cooperate with the W-slots in the plate 54 to cause adjustment of the part 63 of the two-part cam follower. In order to operate the two-part cam follower, I have mounted adjacent to the left side of the housing a cam 65 around the shaft bearing 17 against which the followers 62 bear.

On the other end of housing 18 surrounding the bearing 17, for the shaft 16, I mount another surface cam 66 for an offset one-piece follower 67 having a V-point 68 to engage within the opposite end of the slot in the arm 50 of the gear segment 48 to temporarily hold gear segments 48 in place and center them at the bottom of their travel around the shaft 16. I also provide springs 69 located in recesses 70 for bearing against both said cam followers to hold each of them against their respective cams.

The cam 65 moves follower part 62 lengthwise relative to shaft 16 and the other part 63 of said two-part follower enters one of the W slots of plate 54, which plate has been set by the knurled knob 23 so that the V-point 64 is shifted circumferentially in the keystone slots 61 of the cage 13. By so being moved, the follower part 63 being inside portion 50 of the gear segments 48 (see Figure XIV), these gear segments 48 will be likewise moved circumferentially to rotate to a small degree for proper adjustment spur gears 49. The rotation of said spur gears 49 as shown in Figure VII, through elongated pin 71 having ends fitting in inclined slots 72 and 73 in gear sections 20 and blocks 22, will slide to the right or to the left each individual main driving gear section 20. The cam 65 is designed, as will be understood, to give the correct and desired adjustment for each section 20 to align the teeth of each section of each group so that an infinite number of pitch relation may be established between the driving gearing mechanisms 10 and the driven gear 11.

In Figures I, IX, X, XI and XII, I illustrate the means for providing proper inclination of the follower gear 11 with respect to its driven shaft 74 as required by the lead of the teeth on the driving gear mechanism 10. The rotation of follower 11 caused by its engagement with the driving gear 10 is communicated to the shaft 74 by means of a universal joint 75. This is a type of known universal joint and transmits torque from the follower 11 to the shaft 74 while allowing it to be properly positioned for the lead of driver 10 as stated above. The follower gear proper 11 is returned between a pair of slippers 76 and 77, ball bearings 78 being provided to permit rotation of the gear in the slippers.

It will be seen in Figure I that the shaft 28 adjusted by the knob 23 is provided with a threaded portion 29 carrying a sleeve 32 and, as shown in Figure XI, this sleeve 32 engages a pin 79 engaging slipper portion 77 which portion is adapted to slide radially in suitable ways 80 rigidly attached to the housing. The slipper 76 likewise is adapted to slide radially in ways 81 also attached to the housing, the movement of slipper 76 in the ways being caused by the engagement of the gear 11a with the slipper through the ball bearing joint shown. Thus, it will be seen that the follower 11a may be properly positioned by means of knob 23 and will be retained in this position of rotation while continuing to transmit torque to shaft 74 through the universal joint 75.

Again it is pointed out that the threads 29 and 30 on shaft 28 are correlated so that when knob 23 is turned, it will not only adjust the gear sections 20 as shown to any desired positions, but it will also adjust the driven gear 11 as shown in Figures XI and XII to the correct amount.

It is apparent that, within the scope of the invention, modifications and different arrangements may be made other than is herein disclosed, and the present disclosure is illustrative merely, the invention comprehending all variations thereof.

What I claim is:

1. In a power transmission mechanism, a variable transmission gearing including driving gearing and a driven gear, each having teeth adapted to mesh for the power transmission; a housing supporting said gears; a shaft for the driven gear; means to pivotally mount said driven gear on said shaft whereby the driven gear may be adjusted; a shaft for carrying and driving said driving gearing; a shaft for said driven gear; means to universally connect said driven gear to said last-mentioned shaft; said driving gearing including a series of separately mounted separately movable teeth units constituting said driving gearing; means to vary the lead of the teeth of the driving gearing with respect to the teeth of the driven gear including means to movably position said teeth units axially with respect to said driven shaft to vary the position of said sets of teeth around the periphery of said driving gearing to change the lead as said teeth units mesh with said driven gear, said means including a cam ring mounted in said housing; manual means to vary the position of said ring; means interposed between said cam ring and said teeth units to axially move said units into a predetermined position relative to said driving shaft whereby the lead of said teeth units meshing with said driven gear is controlled by said cam and means to swing said driven gear on said pivoted mounting to change the position of the teeth of the driven gear, said means including a member actuated by the means to vary the lead of the teeth of said driving gearing.

2. In a variable torque transmission device, a driven gear, means to universally mount said gear on a driven shaft; driving gearing mechanism mounted on a driving shaft for driving said driven gear; a housing therefor; means to vary the pitch of the gears of said driving mechanism relative to said driven gear including means for adjusting said universally mounted shaft and means for movably mounting a plurality of sets of gear units around said driving shaft for axial movement relative thereto; means to axially move said gear sets including a manual member and a cam linkage between said means and one of the gear units of each of said sets; a plurality of W-shaped members; a pair of stationary cam rings carried by said housing; wedge elements and cam followers for contacting said cam rings and each of said W-shaped members; and spur gears and driving gear sections, one cam ring arranged to adjust said wedge elements and sets of gear units sequentially upon change of said pitch by said manual means to move said gear sections and spur gears to align said driving gear units with each other around said driving shaft to form a continuous driving sequence of said several sets of gear units for actuating said driven gear and the other cam ring arranged to readjust said gear teeth for individual engagement with the teeth of said driven gear.

3. In a variable pitch power transmission device, a driven gear and a driving gearing having a tooth pitch adjusting mechanism, said mechanism including a housing; an adjustable shaft for the driven gear; a central shaft for the driving gearing; a plurality of adjustable gear tooth sections surrounding said shaft and driven thereby; means to adjust said sections axially of said shaft including means to shift said sections axially and three operating cam mechanisms for actuating said means, one of said mechanisms controlled by a manually operable adjusting knob; a movable slotted cam ring and linkages and connections between said knob and said ring to shift said ring and actuate said adjusting means; a plurality of W-shaped plates; additional linkages for additional shifting said sections; two stationary cam rings fixed in said housing having followers for engagement with said W-shaped plate for shifting said sections and means controlled by said knob for adjusting said shaft of said driven gear.

4. In a variable pitch power transmission device, a housing; a universally mounted driven gear and a driving gearing and a tooth pitch adjusting mechanism, said driving gearing including a central shaft; a plurality of adjustable gear tooth sections surrounding said shaft and driven thereby, said pitch changing mechanism including means to separately shift said sections in seriatum axially of said shaft and three cam controlled mechanisms for actuating said sections, one of said mechanisms controlled by a manually operable adjusting knob having a movable slotted cam ring with linkages and pin connections between said knob and said ring to move said ring and shift said sections; a plurality of W-shaped plates surrounding said shaft; additional linkages for shifting said sections; including two stationary cam rings fixed in said housing having cam followers for engagement with said W-shaped plates; a plurality of circumferentially arranged gear segments; a plurality of spur gears, one carried by each of said gearing sections and adapted to mesh with said last-mentioned gear segments, said cam followers engaging said W-shaped plates to move said gear segments and rotate said spur gears to additionally shift said gearing sections to align the teeth of said driving gearing sections with the teeth of said universally mounted driven gear and means to adjust said universally mounted driven gear proportionately to the adjustment of said driving gearing.

5. In a variable pitch power transmission device, a housing; an adjustably mounted driven gear and a driving gearing mechanism; a tooth pitch adjusting mechanism, for said gearing including a central shaft; a plurality of adjustable gear tooth sections surrounding said shaft and driven thereby, said pitch changing mechanisms including means to shift said sections in groups in seriatum axially of said shaft and two additional cam controlled mechanisms for separately shifting said sections, said group adjusting mechanisms controlled by a manually operable adjusting knob having a movable slotted cam ring with linkages and pin connections between said knob and said ring to move said ring and shift said sections; a plurality of W-shaped plates surrounding said driving shaft; additional linkages for separately shifting the individual sections of said groups of sections, including two stationary cam rings fixed in said housing having cam followers for engagement with said W-shaped plates for shifting said separately adjustable sections, said W plate operating cams constructed to shift said gear sections to lock the same in mesh with said driven gear; and means to adjust said driven gear controlled by said knob.

6. In a variable pitch power transmission device, a housing; a driven gear, a driving gearing and means to adjust both said driven gear and driving gearing simultaneously, the adjusting means for said driving gearing including a tooth pitch adjusting mechanism, said mechanism including a central shaft; a plurality of adjustable gear tooth sections surrounding said shaft and driven thereby, said pitch changing mechanism including means to separately shift said sections in seriatum axially of said shaft and three cam controlled mechanisms for actuating said sections, one of said mechanisms controlled by a manually operable adjusting knob having a movable slotted cam ring with linkages and pin connections between said knob and said ring to move said ring and shift said sections in equal numbered groups; a plurality of W-shaped plates surrounding said shaft; and additional linkages for shifting said sections individually, including two stationary cam rings fixed in said housing having cam followers for engagement with said W-shaped plate; said W plate operating cams constructed to shift said gear sections when said sections are out of mesh with said driven gear and lock said sections in position for driving, said plurality of gears having sets of four individual sections linked together for effecting said pitch changing relation to said driven gear under said manual control; and said W plates and cam means constructed to adjust each gear section for each set of four to obtain a continuous pitch line.

7. In a variable torque transmission device for gearing in which the driving gearing is mounted on a central shaft; and has a plurality of adjustable gear tooth sections surrounding said shaft and driven thereby, said adjusting mechanism including means to separately shift said sections in seriatum axially of said shaft and three cam controlled mechanisms for actuating said sections, one of said mechanisms controlled by a manually operable adjusting knob having a movable slotted cam ring with linkages and pin connections between said knob and said ring to move said ring and shift said sections in equal numbered groups; a plurality of W-shaped plates surrounding said shaft; and additional linkages for shifting said sections individually, including two stationary cam rings fixed in said housing having cam followers for engagement with said W-shaped plates; said W plate operating cams constructed to shift said gear sections when said sections are out of mesh with said driven gear and lock said sections in position for driving, said plurality of gears having sets of four individual sections linked together for effecting said pitch changing relation to said driven gear under said manual control; and said W plates and cam means constructed to adjust each gear section for each set of four to obtain a substantially continuous pitch line.

References Cited in the file of this patent
UNITED STATES PATENTS

| | | |
|---|---|---|
| 1,093,807 | Sandherr | Apr. 21, 1914 |
| 1,553,351 | Wood | Sept. 15, 1925 |
| 1,815,475 | Kambo | July 21, 1931 |
| 2,547,784 | Saives | Apr. 3, 1951 |